United States Patent

Abendschein et al.

[11] Patent Number: 5,419,717
[45] Date of Patent: May 30, 1995

[54] HYBRID CONNECTOR BETWEEN OPTICS AND EDGE CARD

[75] Inventors: Frederic H. Abendschein, Columbia; Edmund J. Haley, Dillsburg, both of Pa.

[73] Assignee: The Whitaker Corporation, Wilmington, Del.

[21] Appl. No.: 290,280

[22] Filed: Aug. 15, 1994

[51] Int. Cl.⁶ .................................................. G02B 6/12
[52] U.S. Cl. .................................. 439/577; 439/247; 385/76; 385/139
[58] Field of Search ............... 385/49, 76, 77, 88, 385/89, 101, 139; 439/577, 246, 247

[56] References Cited

U.S. PATENT DOCUMENTS

| | | | |
|---|---|---|---|
| 3,605,070 | 9/1971 | Krafthefer | 439/357 |
| 3,848,951 | 11/1974 | Michaels et al. | 439/357 |
| 3,874,762 | 4/1975 | Shott et al. | 439/425 |
| 4,211,461 | 7/1980 | Wescott | 439/357 |
| 4,408,819 | 10/1983 | Guelden | 439/638 |
| 4,445,750 | 5/1984 | Grois et al. | 350/96.21 |
| 4,449,784 | 5/1984 | Basov et al. | 350/96.21 |
| 4,496,213 | 1/1985 | Borsuk | 350/96.22 |
| 4,597,631 | 7/1986 | Flores | 350/96.20 |
| 4,678,264 | 7/1987 | Bowen et al. | 350/96.20 |
| 4,767,181 | 8/1988 | McEowen | 350/96.21 |
| 4,806,117 | 2/1989 | Johnston | 439/344 |
| 4,898,549 | 2/1990 | Nakama et al. | 439/701 |
| 4,904,209 | 2/1990 | Nelson | 439/676 |
| 4,919,621 | 4/1990 | Ams | 439/191 |
| 4,938,710 | 7/1990 | Aihara et al. | 439/345 |
| 4,941,838 | 7/1990 | Zinn | 439/350 |
| 5,122,077 | 6/1992 | Maejima et al. | 439/398 |
| 5,158,469 | 10/1992 | Martin | 439/78 |
| 5,174,787 | 12/1992 | Shirai et al. | 439/439 |
| 5,180,312 | 1/1993 | Martin | 439/78 |
| 5,181,858 | 1/1993 | Matz et al. | 439/188 |
| 5,186,645 | 2/1993 | Bixler | 439/350 |
| 5,203,004 | 4/1993 | Bunton et al. | 395/800 |
| 5,222,164 | 6/1993 | Bass, Sr. et al. | 385/14 |
| 5,265,187 | 11/1993 | Morin et al. | 385/135 |
| 5,281,161 | 1/1994 | Kanai | 439/357 |
| 5,288,250 | 2/1994 | Sumida | 439/701 |
| 5,288,251 | 2/1994 | Sumida | 439/701 |
| 5,293,636 | 3/1994 | Bunton et al. | 395/800 |

*Primary Examiner*—Gary F. Paumen
*Attorney, Agent, or Firm*—June B. Schuette

[57] ABSTRACT

A connector (10) between an optical connector (35) and a receptor (11). The connector (10) has a housing (14) with an upper portion (20) and a lower portion (21). A printed circuit board (45) is received in the upper portion (21) and extends outwardly from the front of the upper portion (20). The printed circuit board (45) is vertically and laterally moveable within the upper portion (20). An optical connector (25) is received in, and retained between, side clips (30, 31) on the lower portion (21) of the housing (14). The optical connector (35) is matable with the optical portion (12) of the receptor (11) and the printed circuit board (45) is self-aligning and matable with the electrical portion (13) of the receptor (11).

9 Claims, 3 Drawing Sheets

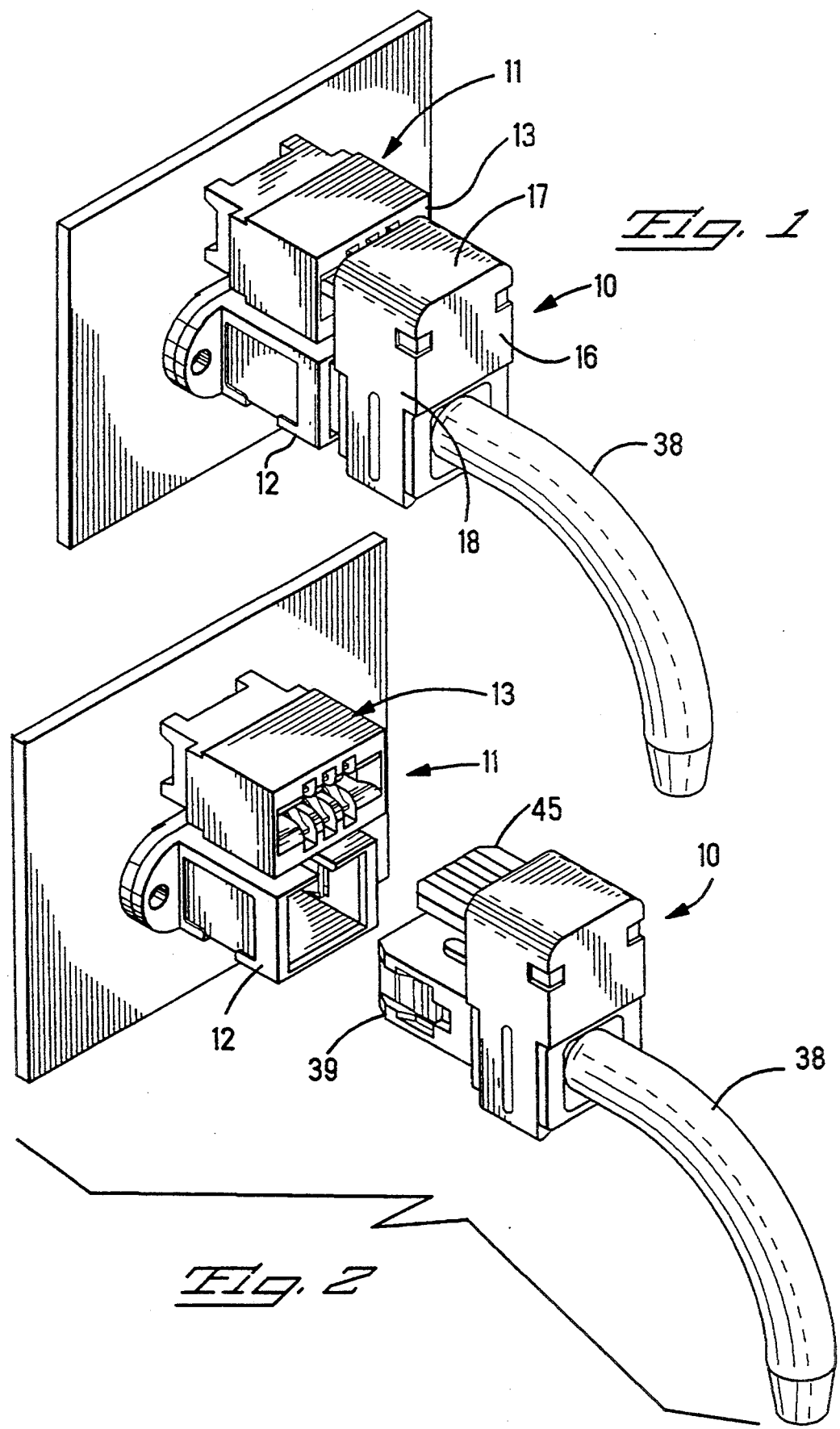

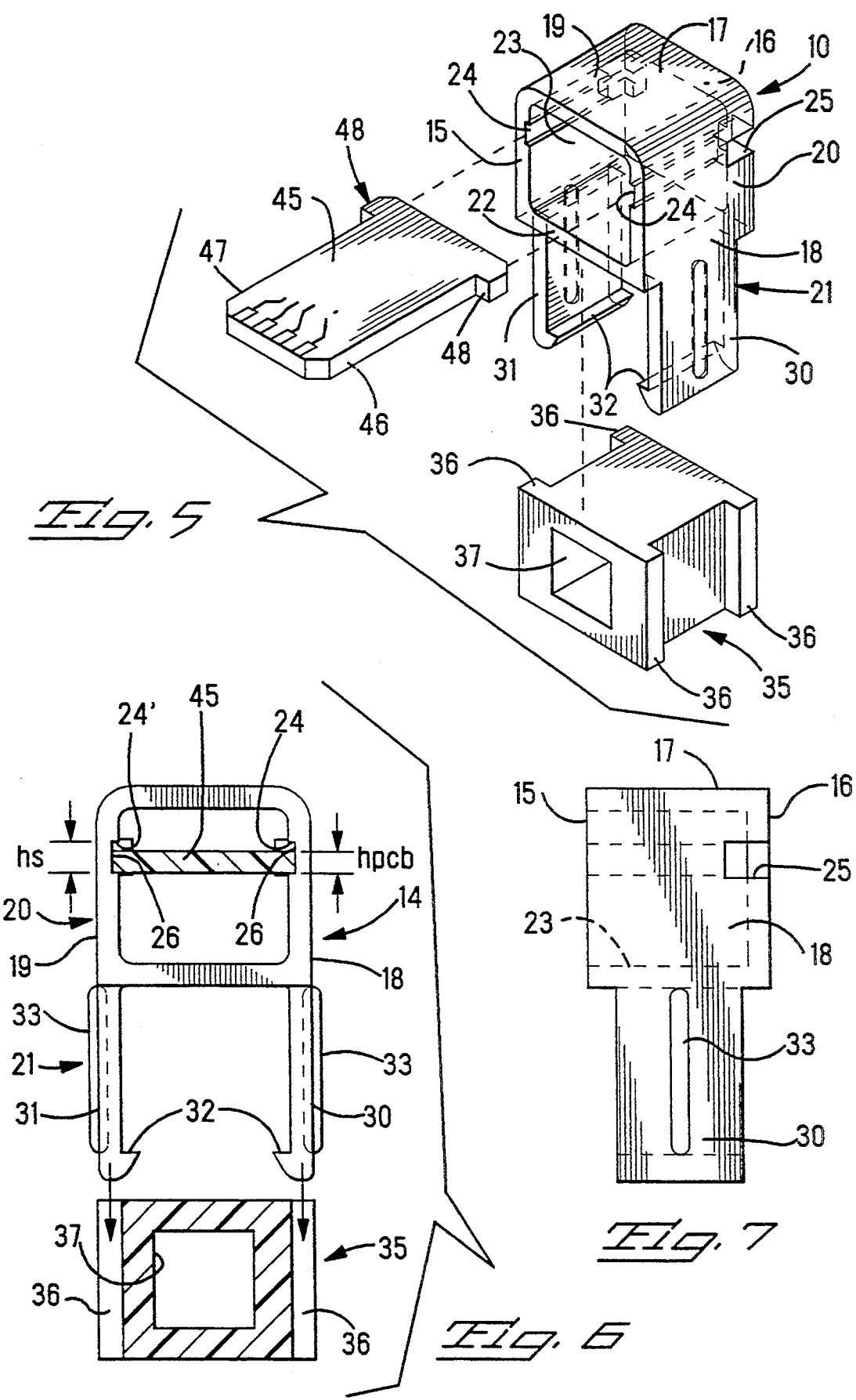

HYBRID CONNECTOR BETWEEN OPTICS AND EDGE CARD

FIELD OF THE INVENTION

The present invention relates to a hybrid connector between an optical connector and an electrical connector to mate with standard receptors and, more particularly, to an SC optical connector and an edge card.

BACKGROUND ART

Optical connectors of various types are widely used in industry and, in particular, the SC type of connector has found broad application. The optical connector carrying the signal from one component is generally mated to a receptor on a second component. Frequently, it is also necessary to concurrently transmit an electrical signal such as by an edge card and introduce the electrical signal into a receptor in the second component. The optical receptor and the electrical receptor are commonly rigidly mounted adjacent to one another in a receptor on the second component and alignment of the optical connector and the electrical connector is required to assure transmission of the signals into the second connector.

The applicants are aware of the following U.S. patents which are directed to connectors:

| U.S. Pat. No. | Inventor(s) |
| --- | --- |
| 3,848,951 | Michaels et al |
| 5,122,077 | Maejima et al |
| 5,181,858 | Matz et al |
| 5,288,250 | Sumida |
| 5,288,251 | Sumida |

Also, the following U.S. patents are directed to connectors combining electrical and optical cables:

| U.S. Pat. No. | Inventor(s) |
| --- | --- |
| 4,449,784 | Basov et al |
| 4,597,631 | Flores |
| 4,678,264 | Bowen et al |
| 4,767,181 | McEowen |

However, none of these patents disclose a connector to accommodate both an optical and an electrical interface and to provide for self-alignment of the electrical interface.

SUMMARY OF THE INVENTION

An object of the present invention is to provide a hybrid connector between an optical connector and an electrical connector in which the electrical connector portion is movably and automatically aligned with the receptor when the optical connector portion is mated to the receptor.

In accordance with the teachings of the present invention, there is disclosed a connector between an optical connector and a receptor, the receptor having an optical portion and an electrical portion. The portions are rigidly mounted in a fixed position with respect to one another. The connector includes a housing having a front side, a back side, an upper portion and a lower portion. The optical connector is received and retained in the lower portion of the housing. The optical connector extends outwardly from the front side and the back side of the housing. A printed circuit board is received in the upper portion of the housing and extends substantially perpendicularly from the front side of the housing. The printed circuit board is vertically and laterally moveable and is engaged within the upper portion of the housing. The optical connector is matable with the optical portion of the receptor. The printed circuit board is vertically and laterally movable so as to be self-aligning and matable with the electrical portion of the receptor.

These and other objects of the present invention will become apparent from a reading of the following specification, taken in conjunction with the enclosed drawings.

BRIEF DESCRIPTION OF THE DRAWINGS

FIG. 1 is a perspective view of the connector of the present invention mated with a receptor.

FIG. 2 is a perspective view of the connector of the present invention separated from the receptor.

FIG. 5 is a perspective view of the housing with the printed circuit board removed from the upper portion and the optical connector being removed from the lower portion.

FIG. 6 is a cross-sectional view of the housing showing the printed circuit board vertically movable in the upper portion and the optical connector removed from the lower portion.

FIG. 7 is a side elevational view of the connector of the present invention.

DESCRIPTION OF THE PREFERRED EMBODIMENTS

Figure 3:
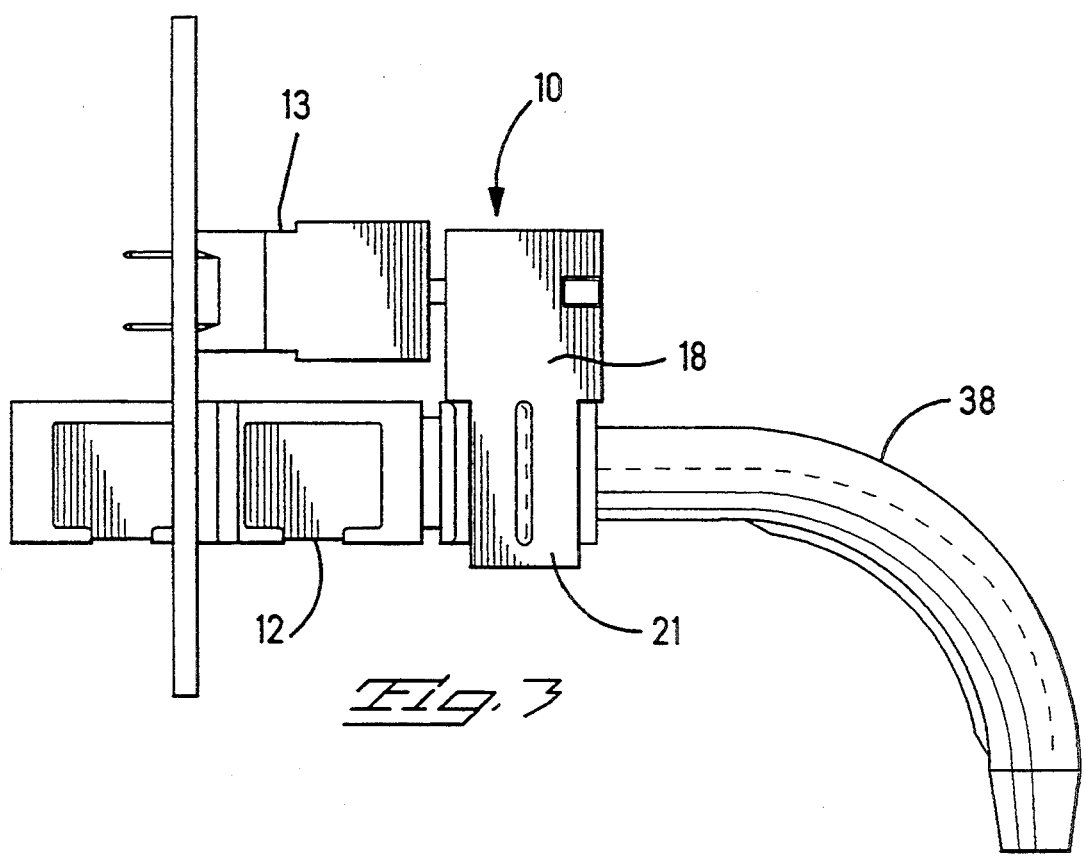
FIG. 3 is a side view of the connector of the present invention mated with the receptor.
Figure 4:
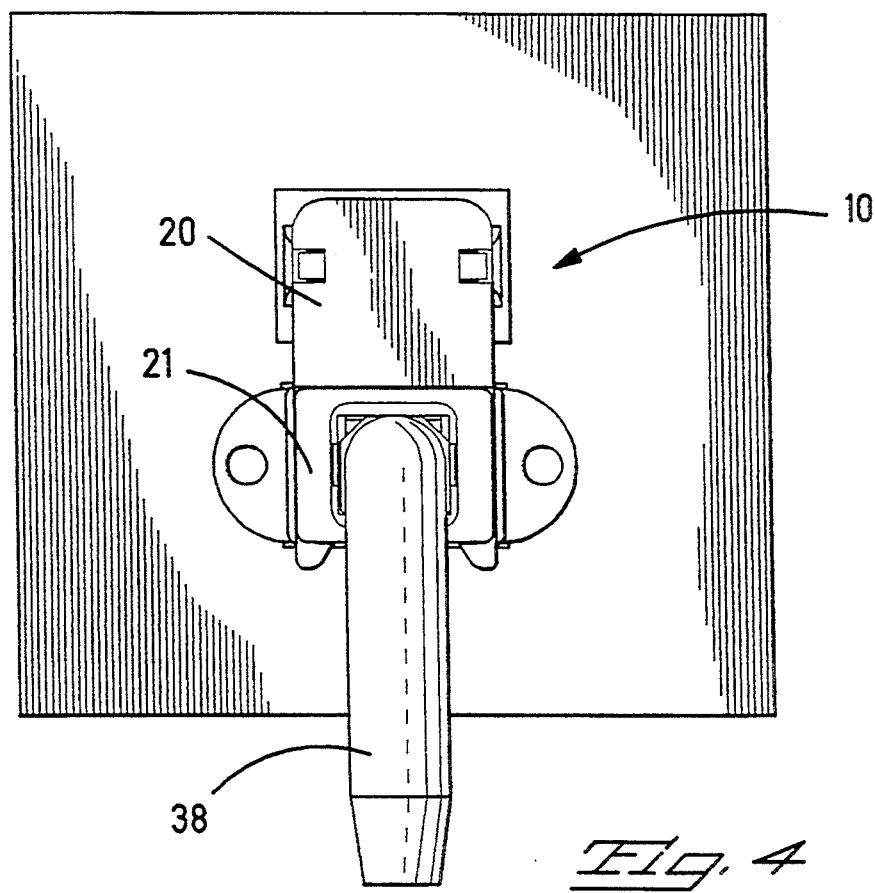
FIG. 4 is a front view of the connector of the present invention mated with the receptor.

Referring now to the figures, the connector 10 is mated with a receptor 11 to effect an optical and an electrical connection within a system. The receptor 11 has an optical portion 12 and an electrical portion 13 which are rigidly mounted on a support within the system and are incapable of movement with respect to one another.

The connector 10 has a housing 14 with a front side 15, a back side 16, a top 17, a first side 18 and an opposite second side 19. The sides 18, 19 extend between the front side 15 and the back side 16. The housing 14 consists of an upper portion 20 and a lower portion 21 with a wall 22 between the portions 20, 21. A blind opening 23 is formed in the front side 15 of the upper portion 20 which is defined by the first side 18, the second side 19, the top 17, the back side 16 and the wall 22. A pair of slots 24, 24' are formed in the opposite sides 18, 19 within the opening 23. The slots 24, 24' are in a plane substantially perpendicular to the first side 18 of the housing 14. The slots 24, 24' each have the same height (hs). Each slot 24, 24' further has a notch 25 formed therein. Preferably, the notches 25 are formed at the end of the respective slot 24, 24' where the slot 24, 24' joins the back side 16 but the notches 25 may be formed at any desired location along the length of the respective slot 24, 24'. Each slot 24, 24' also has a bottom 26 to define the depth of the respective slots 24, 24'. The depths of each slot 24, 24' are approximately equal.

The lower portion 21 of the housing 14 is formed of a first side clip 30 and a second side clip 31. The side clips 30, 31 depend respectively from the first side 18 and the second side 19 of the upper portion 20 of the housing 14. Preferably, the side clips 30, 31 have identical widths, the width being measured between the front side 15 and the back side 16 of the housing 14. Each side clip 30, 31 has a latch 32 formed on the end distal from the upper portion 20 of the housing 14. Each latch 32 is preferably a ledge or hook formed on the distal end and oriented inwardly toward the latch 32 on the opposite clip. It is also preferred that the length of the ledge be the entire width of the respective side clip 30, 31 although shorter latches or segmented latches on each side clip 30, 31 may be utilized. The outer surface of each side clip 30, 31 also preferably has a vertical rib 33 formed thereon, the rib 33 extending from approximately the joint between the upper portion 20 and the lower portion 21 to approximately a point corresponding to the latch 32. The ribs 33 are further disposed approximately midway between the front side 15 and the back side 16 of the respective side clips 30, 31. The ribs provide a degree of rigidity and resiliency to the side clips 30, 31 to assist in retaining the optical connector 35 in the lower portion 21 of the housing 14.

The optical connector 35 has a pair of spaced-apart shoulders 36 formed on opposite sides of the optical connector 35. The space between the shoulders 36 is approximately equal to the width of the side clips 30, 31. The height of the optical connector 35 is approximately equal to the height of the side clips 30, 31 measured between the upper surface of the latch 32 and the lower surface of the wall 22 between the upper portion 20 and the lower portion 21 of the housing 14. In this manner, the optical connector 35 is disposed and retained in the lower portion 21 of the housing 14. Lateral motion of the optical connector 35 is restricted by the tight fit of the respective side clips 30, 31 of the lower portion 21 between the shoulders 36 on optical connector 35. Vertical motion of the optical connector 35 is restricted by the tight fit of the optical connector 35 between the latches 32 on the side clips 30, 31 and the wall 22 between the upper portion 20 and the lower portion 21 of the housing 14. The rib 33 assists in restricting vertical movement by providing a resiliency to the side clips 30, 31 such that the distal ends of side clips 30, 31 may be moved slightly outwardly to receive the optical connector 35 and snap back when the optical connector has been disposed within the lower portion 21 of the housing 14. The optical connector 35 further has an opening 37 in the center to receive the optical cable 38 and plug 39. The plug 39 mates with the optical portion 12 of the receptor 11 and mating is assured due to the immobility of the optical connector.

A printed circuit board 45 is received in the upper portion 20 of the housing and extends substantially perpendicularly from the front side 15 to be mated with the electrical portion 13 of the receptor 11. The printed circuit board 45 has a first side edge 46, an opposite second side edge 47, a height and a length. The printed circuit board 45 has a lug 48 formed on each side edge 46, 47. The printed circuit board 45 is slid into the opening 23 in the upper portion 20 of the housing 14 such that the side edges 46, 47 are received in the slots 24, 24' in the sides 18, 19. The lugs 48 engage the respective notches 25 to retain the printed circuit board 45 in the upper portion 20. The first side 18 and the second side 19 of the housing 14 adjacent to the slots 24, 24' are sufficiently thin to permit the sides 18, 19 to flex to allow the lugs 48 on the printed circuit board 45 to have an interference fit with the respective sides 18, 19 and to slide within the slots 24, 24' until the lugs 48 snap into the respective notches 25. In this manner, the printed circuit board 45 is restrained from forward and backward movement with respect to the housing 14. The width of the printed circuit board 45 is less than the width of the blind opening 23 between the bottoms 26 of the slots 24, 24' on the sides of the upper portion 20. Thus, the printed circuit board 45 is free to move laterally within the upper portion 20 with the restriction that the width of the printed circuit board 45 must be sufficient such that the lateral movement cannot exceed the depth of the respective slots 24, 24'. The height (hpcb) of the printed circuit board 45 is less than the height of each of the slots 24, 24' (FIG. 6). Thus, the printed circuit board 45 is free to move vertically within the slots 24, 24'.

The combined freedom of lateral and vertical movement of the printed circuit board 45 allows the printed circuit board 45 to be self-aligning to facilitate mating with the receptor. Since the optical connector 35 is immobile and the optical and electrical portions of the receptor 12, 13 are rigidly mounted, any tolerance extremes or variations in the connector result in difficulties, and even an inability, to effect both an optical and electrical mating without the self-aligning feature of the present invention. By use of the present invention, when the optical connector 35 is mated with the optical receptor 12, the printed circuit board 45 self-aligns and automatically adjusts laterally and/or vertically, to be mated with the electrical portion of the receptor 13.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A connector having an optical connector for mating with a receptor, the receptor having an optical portion and an electrical portion, said portions being rigidly mounted in a fixed position with respect to one another, the connector comprising:

a housing having a front side, a back side, an upper portion and a lower portion, the optical connector being received and retained in the lower portion of the housing, the optical connector extending outwardly from the front side and the back side of the housing, a printed circuit board being received in the upper portion of the housing and extending substantially perpendicularly from the front side of the housing, the printed circuit board being vertically and laterally movable and engaged within the upper portion of the housing, and the optical connector being matable with the optical portion of the receptor and the printed circuit board being vertically and laterally movable so as to be self-aligning and matable with the electrical portion of the receptor.

2. The connector of claim 1, further comprising the housing having a first side and an opposite second side, a blind opening formed in the front side of the upper portion of the housing between the first side and the second side thereof, a pair of slots formed within the opening, a first slot being in the first side and a second slot being in the second side, said slots being in a first plane substantially perpendicular to the first side of the housing, said slots each having the same height, the printed circuit board having a first side edge and a second opposite side edge, each side edge having a height, said height being less than the height of the respective slots in the sides of the upper portion, the printed circuit board being received in said slots permitting vertical movement of the printed circuit board within the slots such that the printed circuit board may self-align for mating with the electrical portion of the receptor and means for retaining the printed circuit board within the slots.

3. The connector of claim 2, wherein each slot has a notch formed therein, a lug formed on each side edge of the printed circuit board, the lugs engaging the respective notches wherein the printed circuit board is retained within the slots in the upper portion of the housing.

4. The connector of claim 3, wherein the first side and the second side of the upper portion of the housing adjacent to the respective slots are sufficiently thin wherein said sides flex to permit the respective lugs on the printed circuit board to have an interference fit with the respective sides of the upper portion, such that the respective lugs may snap into the respective notches and retain the printed circuit board in the upper portion of the housing.

5. The connector of claim 2, wherein the first slot and the second slot each have a respective depth and a respective bottom, a width between the respective bottoms of the slots, the printed circuit board having a width, the width of the printed circuit board being less than the width between the respective bottoms permitting lateral movement the printed circuit board not to exceed the depth of the respective slots, such that the printed circuit board may self align for mating with the electrical portion of the receptor.

6. The connector of claim 1, the lower portion of the housing further comprising a first side clip and a second side clip, said side clips depending respectively from the first side and the second side of the upper portion of the housing, each side clip having a respective end distal from the upper portion of the housing, each end having a latch formed thereon, the optical connector being secured between the respective latches and the upper portion of the housing preventing vertical movement therebetween and assuring mating of the optical connector with optical portion of the receptor.

7. The connector of claim 1, the lower portion of the housing further comprising a first side clip and a second side clip, said side clips depending respectively from the first side and the second side of the upper portion of the housing, each side clip having a width substantially identical to the width of the other side clip, the optical connector having a pair of spaced-apart shoulders on opposite sides thereof, the space between the shoulders being approximately equal to the width of the side clips on the lower portion of the housing, the respective side clips on the housing being received and retained between the respective shoulders on the optical connector preventing lateral movement between the housing and the optical connector and assuring mating of the optical connector with the optical portion of the receptor.

8. A connector having an optical connector for mating with a receptor, the receptor having an optical portion, the connector comprising:

a housing having a front side, a back side, an upper portion, a first side clip and a second side clip, the optical connector being received and retained in between the side clips of the housing, the optical connector extending outwardly from the front side and the back side of the housing, each clip having a respective end distal from the upper portion of the housing, each end having a latch formed thereon, the optical connector being secured between the respective latches and the upper portion of the housing, thus preventing vertical movement therebetween and assuring mating of the optical connector with the optical portion of the receptor.

9. The connector of claim 8, further comprising each side clip having a width substantially identical to the width of the other side clip, the optical connector having a pair of spaced-apart shoulders on opposite sides thereof, the space between the shoulders being approximately equal to the width of the side clips on the housing, the respective side clips on the housing being received and retained between the respective shoulders on the optical connector preventing lateral movement between the housing and the optical connector, and assuring mating of the optical connector with the optical portion of the receptor.

* * * * *